UNITED STATES PATENT OFFICE.

LOUIS F. KIRCHHOFER, OF UNION HILL, NEW JERSEY, ASSIGNOR, BY MESNE ASSIGNMENTS, TO JAMES E. WHEELER.

IMPROVEMENT IN PROCESSES FOR PRESERVING MILK.

Specification forming part of Letters Patent No. 141,878, dated August 19, 1873; application filed February 10, 1873.

*To all whom it may concern:*

Be it known that I, LOUIS FRANÇOIS KIRCHHOFER, of Union Hill, in the State of New Jersey, have invented a certain Process for Preserving Milk in its Natural State, of which the following is a specification:

The object of this invention is to subject the milk to such a treatment, without altering in any wise its elements or taste, and without the addition of any foreign substance whatever, that it will be preserved in its natural state without any change, except that of the rising of the cream, for several months, whether it be kept in a state of rest in storage, or be subject to constant movement, as on sea voyages.

To accomplish this result the milk, as soon as it is drawn from the cow, is placed in cans or bottles, which are filled nearly full of milk, and immediately corked tightly or hermetically sealed or closed. The cans or bottles are then placed in a bath of water heated to the same temperature as the milk, in such a manner as to allow a free circulation of water beneath and around but not over them. The water is then slowly heated until it reaches a temperature of between one hundred and sixty degrees (160°) and one hundred and seventy degrees (170°) of Fahrenheit's thermometer. The bath is then maintained at this temperature for a greater or less length of time, according to the period during which it is desired to preserve the milk—for example, for one hour to preserve the milk four or five weeks, and five hours to preserve it for eight months or a year. The fire is then withdrawn, and the bath allowed to cool slowly until it reaches its former temperature, when the cans and bottles are withdrawn, and the operation is completed.

It is absolutely necessary for the success of this process that all the vessels containing the milk should be perfectly clean and sweet, and the milk itself unadulterated and undiluted.

If the milk is heated to a higher temperature than that above stated it will have a cooked taste, and if it is not heated so high, or is not maintained at that temperature for a suitable length of time, it will not keep sweet.

Milk so treated can be kept for a year, and when the vessels containing it are opened it will be found perfectly sweet and possessing its natural taste.

I claim as my invention—

The process herein described for preserving milk, consisting in the gradual raising of the temperature of the milk before it has cooled after milking the cow from its natural temperature to between one hundred and sixty degrees (160°) and one hundred and seventy degrees (170°) of Fahrenheit's thermometer, and the continued subjection of the milk to that temperature for a longer or shorter period, according to the length of time it is desired to preserve the milk.

L. F. KIRCHHOFER.

In presence of—
  A. F. BRITTON,
  J. H. BROWN.